US011818677B2

(12) United States Patent
Zaifuddin

(10) Patent No.: US 11,818,677 B2
(45) Date of Patent: Nov. 14, 2023

(54) RESTORATION OF LONG-DURATION SERVICES

(71) Applicant: T-Mobile USA, Inc., Bellevue, WA (US)

(72) Inventor: Sabuhi Kiran Zaifuddin, Bellevue (CA)

(73) Assignee: T-Mobile USA, Inc., Bellevue, WA (US)

( * ) Notice: Subject to any disclaimer, the term of this patent is extended or adjusted under 35 U.S.C. 154(b) by 290 days.

(21) Appl. No.: 17/390,444

(22) Filed: Jul. 30, 2021

(65) Prior Publication Data

US 2023/0036184 A1 Feb. 2, 2023

(51) Int. Cl.
*H04W 60/00* (2009.01)
*H04L 67/55* (2022.01)

(52) U.S. Cl.
CPC ............. *H04W 60/00* (2013.01); *H04L 67/55* (2022.05)

(58) Field of Classification Search
CPC .... H04W 60/00; H04L 67/55; H04L 65/1069; H04L 65/1108; H04L 65/1073
See application file for complete search history.

(56) References Cited

U.S. PATENT DOCUMENTS 10,212,192 B2 * 2/2019 Wallis ............... H04L 67/55
2018/0288228 A1 * 10/2018 Frazier ............ H04M 3/42246

OTHER PUBLICATIONS

Extended European Search Report dated Dec. 13, 2022 for European Patent Application No. 22180184.8, 10 pages.

* cited by examiner

*Primary Examiner* — Brandon J Miller
(74) *Attorney, Agent, or Firm* — Lee & Hayes, P.C.

(57) ABSTRACT

When a serving call session control function (S-CSCF) of a mobile network fails or is otherwise unavailable, over-the-top (OTT) services for a mobile terminating (MT) user equipment (UE) may be disrupted, as the network may lack routing information for sending invites and/or services to the corresponding OTT application(s). According to the disclosure, OTT services can be restored by sending an out-of-band message to an OTT application to cause that OTT application to reregister with the mobile network to establish new pathways for providing OTT services from the mobile network. An application server, in cooperation with a secure push proxy (SPP) system, can send push notifications to OTT applications of a MT UE when that MT UE is associated with OTT services and when the OTT applications are not registered with the mobile network. The push notifications cause the OTT applications to reregister with the mobile network to restore OTT services.

20 Claims, 11 Drawing Sheets

RESTORATION OF LONG-DURATION SERVICES

BACKGROUND

Over-the-top (OTT) applications, such as WHATSAPP, FACEBOOK MESSENGER, SKYPE, etc., are commonly used for communications services on mobile devices, sometimes via Internet protocol multimedia system (IMS). These OTT applications have universally unique identifiers (UUID) on which the OTT applications operate. Some of the OTTs are registered on the mobile network to enable communications services on the mobile network, similar to how the UE itself is registered on the mobile network. In some cases, the OTTs or other soft-client services are generally registered on the mobile network, without requiring reregistration, for relatively long times, such as multiple days. In contrast the UE reregisters its IMEI with the mobile network with a relatively greater frequency, such as every hour, or even every 30 minutes or so.

When the mobile network has a core network disruption (e.g., unavailable serving call session control function (S-CSCF) server), or otherwise unavailable, soft-client services (e.g., OTT services) for a mobile terminating (MT) UE may be disrupted, as the mobile network may not have current information to be able to route an OTT service (e.g., a call, text message, etc.) to the corresponding OTT application. As a result, a call or service may be routed to voicemail for an OTT application when there is a core network service disruption. Even if hardware (e.g., UE with mobile station international subscriber directory number (MSISDN)), by way of the IMEI is reregistered, the corresponding UUIDs of the OTTs associated with the MSISDN may not be reregistered with the mobile network. Since, the OTT applications reregister with the mobile network relatively infrequently, routing disruptions due to an unavailable S-CSCF may not be repaired in a timely way.

The disclosure herein addresses some of the infirmities discussed above.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
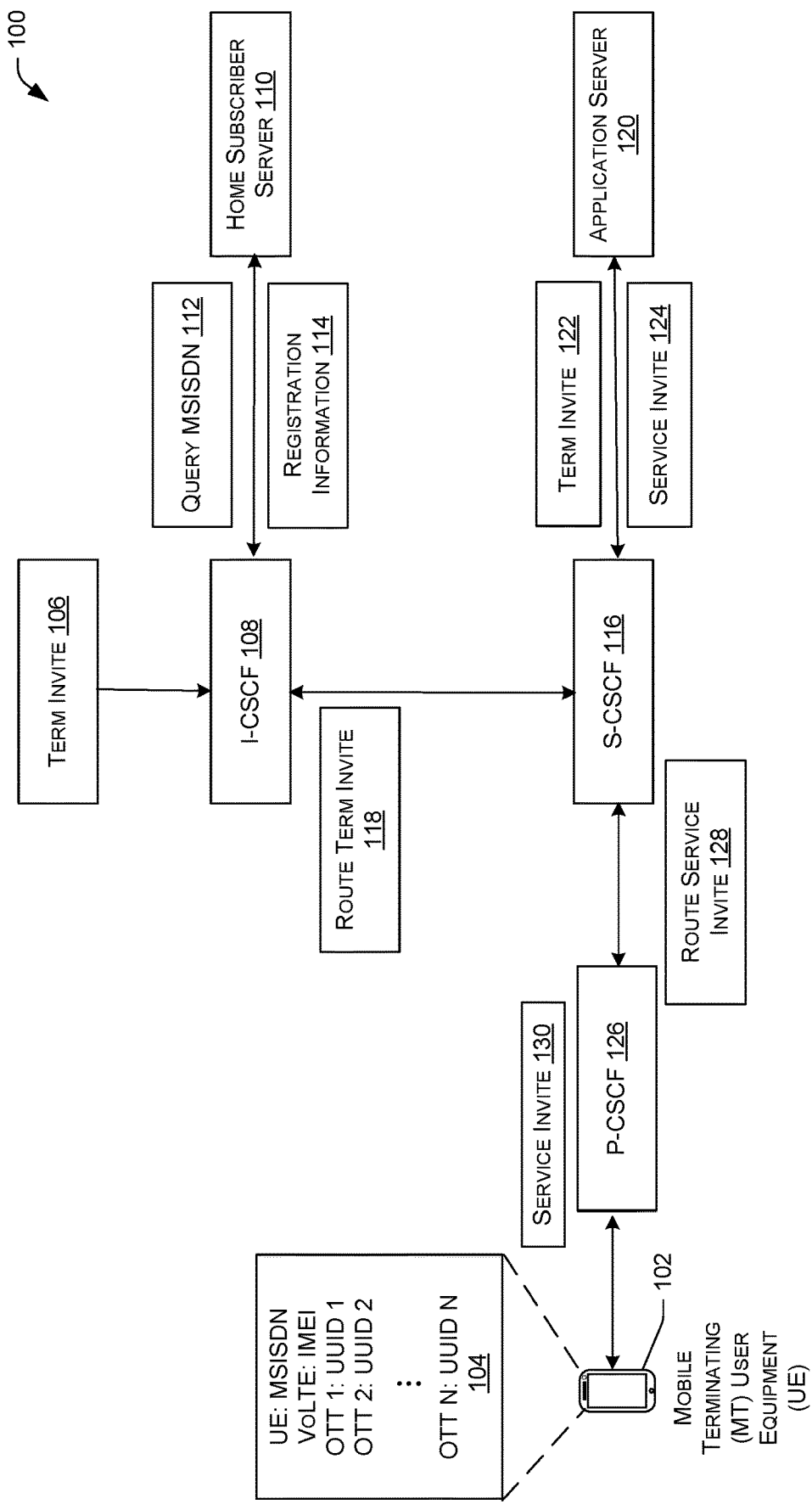
FIG. 1 illustrates a schematic diagram of an example environment with a mobile network infrastructure including a mobile terminating (MT) user equipment (UE) to which OTT services may be provided, in accordance with examples of the disclosure.

Techniques for restoring over-the-top (OTT) services or soft-client application associated with an MSISDN corresponding to one or more mobile terminating (MT) user equipment (UE) when components of a mobile network are not available in its previous configuration are discussed herein. Under normal operations, when an OTT service (e.g., a voice call, a text message, etc.) is to be provided to the MT UE, a variety of mobile network entities, such as a proxy call session control function (P-CSCF) server (hereinafter referred to as P-CSCF), an interrogating serving call session control function (I-CSCF) server (hereinafter referred to as I-CSCF), a serving call session control function (S-CSCF) server (hereinafter referred to as S-CSCF), an application server, etc., cooperate to open a session with the MT UE on which the OTT application corresponding to the OTT service is running. Opening this session includes routing a terminating (or term) invite to the MT UE via its corresponding P-CSCF and S-CSCF. However, if the S-CSCF is down, not functioning, or is otherwise unavailable, the protocols as currently defined in the Third Generation Partnership Project (3GPP), such as in technical section 23.380, may not allow for restoration of services to enable a session invite and subsequent routing of the OTT service to the MT UE. In this case, the OTT services (e.g., voice call, test message, etc.) that were initially registered for a relatively long duration may be routed to voicemail. These types of failures may result in unsatisfactory customer experience.

According to examples of the disclosure, to prevent failures in routing of a term invite, such as a session initiation protocol (SIP) invite, to the MT UE when the MT UE's corresponding S-CSCF is unavailable, an out of band message (e.g., a push proxy message, HTTP message, etc.) may be sent to the MT UE to cause the MT UE to reregister its OTT applications with the mobile network. In this way, the MT UE and the OTT applications operating thereon are able to reregister the OTT applications to restore corresponding OTT services to the MT UE. A push notification to cause an OTT application to reregister with the mobile network may be sent to each OTT application that is associated with a UE, such as the MT UE. An application server may determine that registration information has been lost for a particular user and/or MT UE and, in cooperation with a secure push proxy (SPP) server (hereinafter referred to as SPP), cause the push notifications to be sent to the corresponding OTT applications associated with the MT UE.

The application server, in some cases, may identify that OTT service is to be provided to a particular OTT application and identify that the corresponding universally unique identifiers (UUID) of the OTT application and/or an international mobile equipment identity (IMEI) of the MT UE is not registered with the mobile network. The application server, before attempting to send a service invite to the OTT application, may instruct the SPP to send a push notification to each of the OTT applications associated with the MT UE and/or the corresponding MSISDN to cause those OTT applications to reregister with the mobile network. Alternatively, the application server may receive a registration message associated with an IMEI of a UE and identify that the corresponding MSIDSDN is associated with one or more OTT services. Based at least in part on identifying that the MT UE and/or the corresponding MSISDN is associated with the one or more OTT services, the application server may instruct the SPP to send a push notification to each of the OTT applications associated with the MT UE to cause those OTT applications to reregister with the mobile network. In this way, the reregistration of an OTT application, for which there is incomplete or stale routing information within the mobile network, can be prompted by an OTT service to be offered to that OTT or when an associated hardware (e.g., by way of the corresponding IMEI) registers.

To enable the functionality, as described herein, the application server may have information about whether a particular MT UE, and an IMEI where both the IMEI and the MT UE are associated with the same MSISDN, have OTT services. In some cases, the application server may not have information about which or how many OTT applications are associated with a particular IMEI, but the application server may have information about whether the IMEI has any OTT applications associated therewith. The association of the IMEI and OTT applications, in this sense and throughout this disclosure, refers to the IMEI and the OTT applications being associated with a common MSISDN. The application server may send a push notification, such as a hypertext transfer protocol (HTTP) message, to the SPP. The SPP may have information and/or be able to access information about which and/or how many OTT applications are associated with a particular MSISDN or related IMEI. The SPP, based at least in part on receiving the push notification from the application server, may generate a push notification, such as an HTTP message, for each of the OTT applications associated with the particular MSISDN or related IMEI to reregister with the mobile network. In this way, each of the OTT applications receive an out of band message (e.g., a push notification/HTTP message) from the SPP to cause the OTT applications to reregister with the mobile network. When the OTT applications reregister with the mobile network, their respective OTT services are restored, as the elements of the mobile network are able to route services and/or control functions to the individual OTT applications.

OTT applications and/or other soft clients with UUIDs, unlike MT UE with their IMEI, reregister relatively infrequently, such as days, and up to 10 days or more. Thus, without the mechanisms as described herein, OTT services could experience extended periods of downtime when an S-CSCF associated with the MT UE is rendered unavailable. In some cases, these OTT service may pertain to messaging, such as in the form of a soft-phone or text message application. Therefore, service disruptions to OTT services may result in ineffectual core communications and messaging functions.

Certain implementations of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the examples, as described herein. Like numbers refer to like elements throughout.

FIG. 1 illustrates a schematic diagram of an example environment 100 with a mobile network infrastructure including a MT UE 102 to which OTT services may be provided, in accordance with examples of the disclosure. The environment 100 shows a normal process flow when all relevant portions of the mobile network are functional and terminating OTT services are properly being provided to MT UE 102. The MT UE 102 with various hardware and/or applications may have a variety of identifiers 104 associated therewith. For example, as disclosed herein, the MT UE 102 may have a mobile station international subscriber directory number (MSISDN) and/or a related international mobile subscriber identity (IMSI). The MT UE 102 may further have a voice over long term evolution (VoLTE) service with an associated IMEI. The MT UE 102 may still further have one or more OTT applications OTT 1, OTT 2, . . . OTT N (hereinafter referred to individually or in combination as OTT or OTTs) operating thereon, each having its own UUID UUID 1, UUID 2, . . . UUID N (hereinafter referred to individually or in combination as UUID or UUIDs). Although depicted as operating on a single MT UE 102, the OTTs associated with a particular MSISDN may operate on a variety of different UEs associated with the subscriber identified by the MSISDN.

The MT UE 102 may have a communications application and/or software installed thereon that allows the MT UE 102 to interact with users to conduct and/or provide communications services and/or OTT services. Before services are provided to the MT UE 102 in a terminating fashion, other elements of environment 100 attempt to open a service session with the MT UE 102, such that the MT UE 102 has a data plane and/or a control plane connection with elements of the mobile network. While for an mobile originating (MO) UE (not shown), the MO UE will commence the process of establishing the data plane and/or the control plane connection with elements of the mobile network, in the case of the MT UE 102 other elements of environment 100 will commence the process of establishing the data plane and/or the control plane connection with elements of the mobile network, such as in response to a service (e.g., connecting an incoming call) that is to be provided to the MT UE 102. In receiving services, the MT UE 102 and the mobile network may establish (e.g., open) a session via any variety of protocols, such as those involving a service or term invite. Opening a session may further entail establishing radio links between the MT UE 102 and the mobile network, such as via radio nodes (e.g., eNodeB, gNodeB, etc.), using any suitable messaging protocols, such as SIP messages and/or message session relay protocol (MSRP) messages. The MT UE 102 may interact with mobile network infrastructure via any variety of communications protocols and/or communications generations, such as third generation (3G), fourth generation (4G), long-term evolution (LTE), fifth generation (5G), 5G new radio (5G NR), any variety of millimeter wave standards, or the like.

The MT UE 102 may further be configured to identify that a user wishes to accept communications services, such as by interaction with the user via one or more user interfaces (e.g., touch screen), and may cooperate with one or more mobile network infrastructure to provide those communications services, such as OTT-based services. The OTTs operating on the MT UE 102 may provide any variety of services, such as rich communications service (RCS), virtual/soft-phone service, data service, voice service, short message service (SMS), A/V call service, and/or any other suitable mobile communications services. Although the MT UE 102 is depicted as a smartphone, the MT UE 102 may be any suitable communications device configured to send and/or receive OTT services, such as a laptop computer, a tablet computer, a voice device, combinations thereof, or the like. MT UE 102 may further include, but are not limited to, televisions, set-top boxes, computers, computing devices, servers, notebook computers, netbook computers, personal digital assistants (PDAs), smartphones, telephones, tablets, in-vehicle infotainment systems (IVIs), Internet of Things (IoT) devices, combinations thereof, or the like. It should be understood, that in some cases an individual subscriber of network telecommunications/data services may have more than one corresponding MT UE 102 with which he or she can access the long-duration services (e.g., OTT services) discussed herein.

When a terminating OTT service is to be provided to the MT UE 102, a term invite 106 may be received by an I-CSCF 108. The term invite may be a control message using DIAMTER and/or session initiation protocol (SIP). The term invite 106 may have identifying information of the MT UE 102, such as the MSISDN of the MT UE 102. The I-CSCF 108, based at least in part on receiving the term invite 106, may interact with a home subscriber server (HSS) 110 to query the MSISDN 112. Based at least in part on querying the MSISDN 112, the HSS 110 may provide registration information 114 to the I-CSCF 108. The registration information may include identification of a corresponding S-CSCF 116 associated with the MT UE 102. Although one S-CSCF 116 is depicted here for the purpose of explanation, typically a mobile network will have many S-CSCF. Therefore, to be able to properly route a term/session invite to the MT UE 102 the I-CSCF 108 would need to know the current S-CSCF 116 that is associated with the MT UE 102.

The I-CSCF 108 may then route the term invite 118 to the serving S-CSCF 116 associated with the MT UE 102, as identified by the HSS 110. The S-CSCF 116 may then send to an application server 120 the term invite 122 and receive a service invite 124. The application server 120 may be of any suitable form, such as a telephony application server (TAS), and provide a variety of service functions within the mobile network. The S-CSCF 116 may route, to a P-CSSF associated with the MT UE 102, the service invite 128. The P-CSCF 126, in turn, may route the service invite 130 to the MT UE 102 to open a session to receive OTT services from the application server 120. When the MT UE 102 receives the service invite 130, the MT UE establishes a session with the mobile network, via the P-CSCF 126, to receive OTT service, as provided by the application server 120. In some cases, the service invite 130 may include two separate service invites, where one invite is directed to the hardware (e.g., IMEI instance) and the other invite is directed to the OTT (e.g., UUID instance).

The process of routing the term/service invites from the I-CSCF 108 through various nodes to the MT UE 102 successfully is enabled by the S-CSCF being aware of the correct P-CSCF 126 with which the MT UE 102 is associated. In the environment 100, the HSS 110, the I-CSCF 108, or the application server 120 is not aware of the P-CSCF 126 that is associated with the various OTT applications operating on the MT UE 102. The S-CSCF 116 is aware of the P-CSCF 126 associated with the OTTs operating on the MT UE 102. Thus, if a different S-CSCF was to be sent the term invite 118 from the I-CSCF 108, rather than S-CSCF 116, then the that S-CSCF would not know which P-CSCF of a plurality of P-CSCFs within the mobile network to use to route the service invite 128 to the MT UE 102. Although in FIG. 1, the IMEI and the UUIDs are depicted as registering with the same P-CSCF 126, it should be understood that in some cases, the UUIDs may be registered with a different P-CSCF 126 than the P-CSCF 126 with which the IMEI and/or MT UE 102 is registered. Furthermore, a particular OTT application may not be installed on the same MT UE 102 as with which it shares a common MSISDN.

Figure 2:
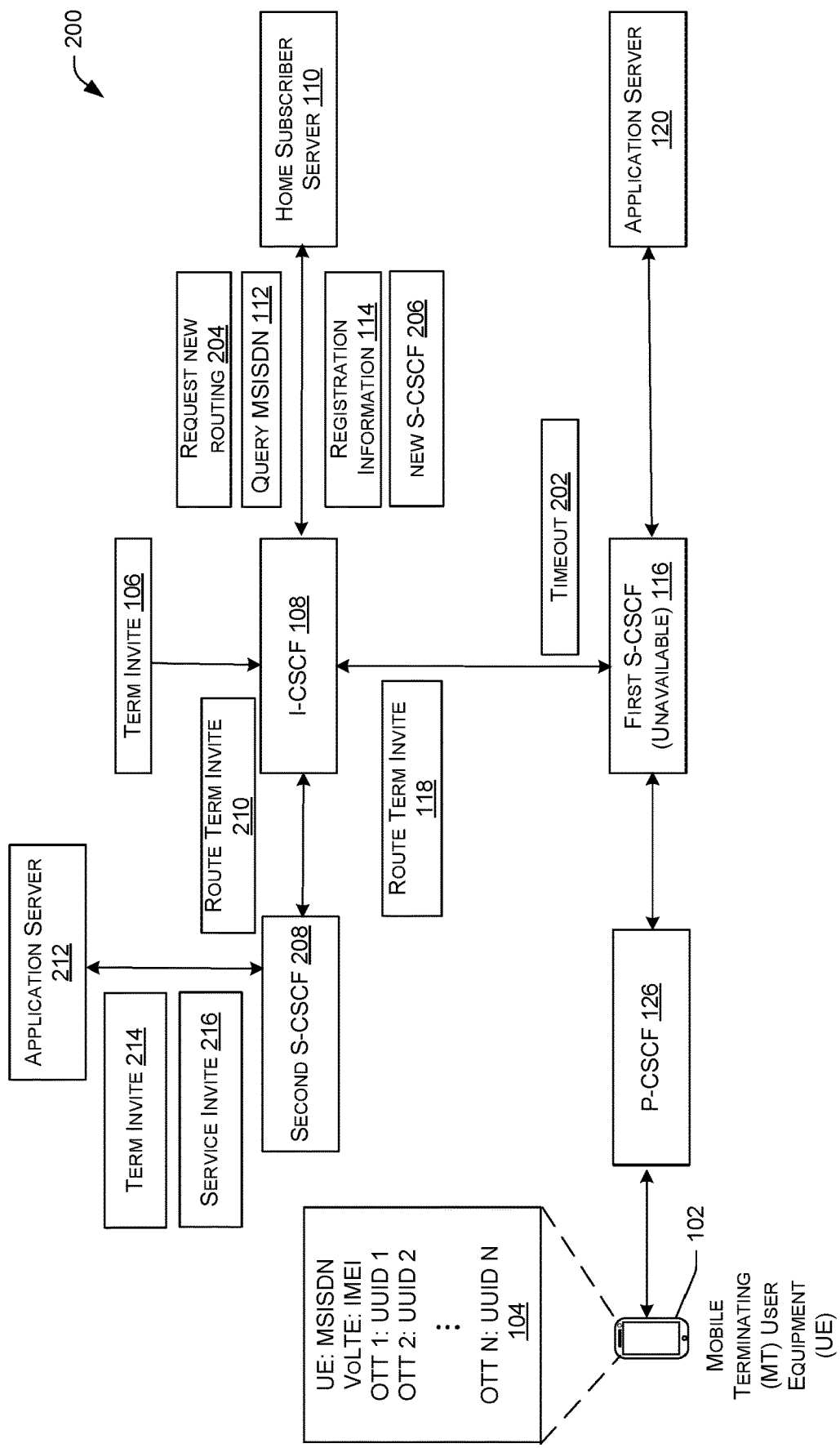
FIG. 2 illustrates a schematic diagram of an example environment where OTT services to the MT UE of FIG. 1 is disrupted due to an unavailable serving call session control function (S-CSCF) server, in accordance with examples of the disclosure.

FIG. 2 illustrates a schematic diagram of an example environment 200 where OTT services to the MT UE 102 of FIG. 1 is disrupted due to an unavailable S-CSCF 116, in accordance with examples of the disclosure. In this scenario, the S-CSCF 116 (hereinafter the first S-CSCF 116) may be down or otherwise unavailable. When the term invite 106 is received by the I-CSCF 108, the I-CSCF 108 interacts with the HSS 110 to query the MSISDN 112 and, in response, receives registration information 114 from the HSS, as described in conjunction with FIG. 1. The registration information 114 indicates that the first S-CSCF is associated with the MT UE 102. As a result, the I-CSCF 108 attempts to route the term invite 118 to the first S-CSCF 116, but fails, since the first S-CSCF 116 is unavailable. The I-CSCF 108 receives and/or generates an indication of a timeout 202. This timeout 202 may be by any suitable protocol, such as DIAMETER/SIP. Responsive to the timeout 202, the I-CSCF 108 may request new routing information 204 from the HSS 110. The HSS 110 may assign a new S-CSCF 206, shown as a second S-CSCF 208, to the MT UE 102. However, at this point, the second S-CSCF 208 is not aware of the P-CSCF 126 that is associated with the MT UE 102.

The I-CSCF 108, after receiving an indication of the second S-CSCF 208, may route the term invite 210 to the second S-CSCF 208. The second S-CSCF 208 then routes the term invite 214 to a application server 212. Although a new application server 212 is depicted here as receiving the term invite 214, in other cases, the second S-CSCF 208 may send the term invite to the original application server 120. The second S-CSCF 208 may receive a service invite 216 from the application server 212. As discussed herein, the first S-CSCF 116, which is now unavailable, had the routing information (e.g., the P-CSCF 126 association) of the MT UE 102. However, without the OTTs of the MT UE reregistering with the mobile network, the second S-CSCF 208 may not have routing information for the MT UE 102. As a result, the S-CSCF 208 may be unable to route the service invite 216 to the MT UE 102 via the P-CSCF 126. As a result, the OTT service may be routed to voicemail. In this case, by not being able to route a service invite 216 to an OTT associated with the MT UE 102, due to an unavailable S-CSCF 116, the user of the MT UE 102 may not be able to receive the OTT services that he or she would otherwise receive.

Figure 3:
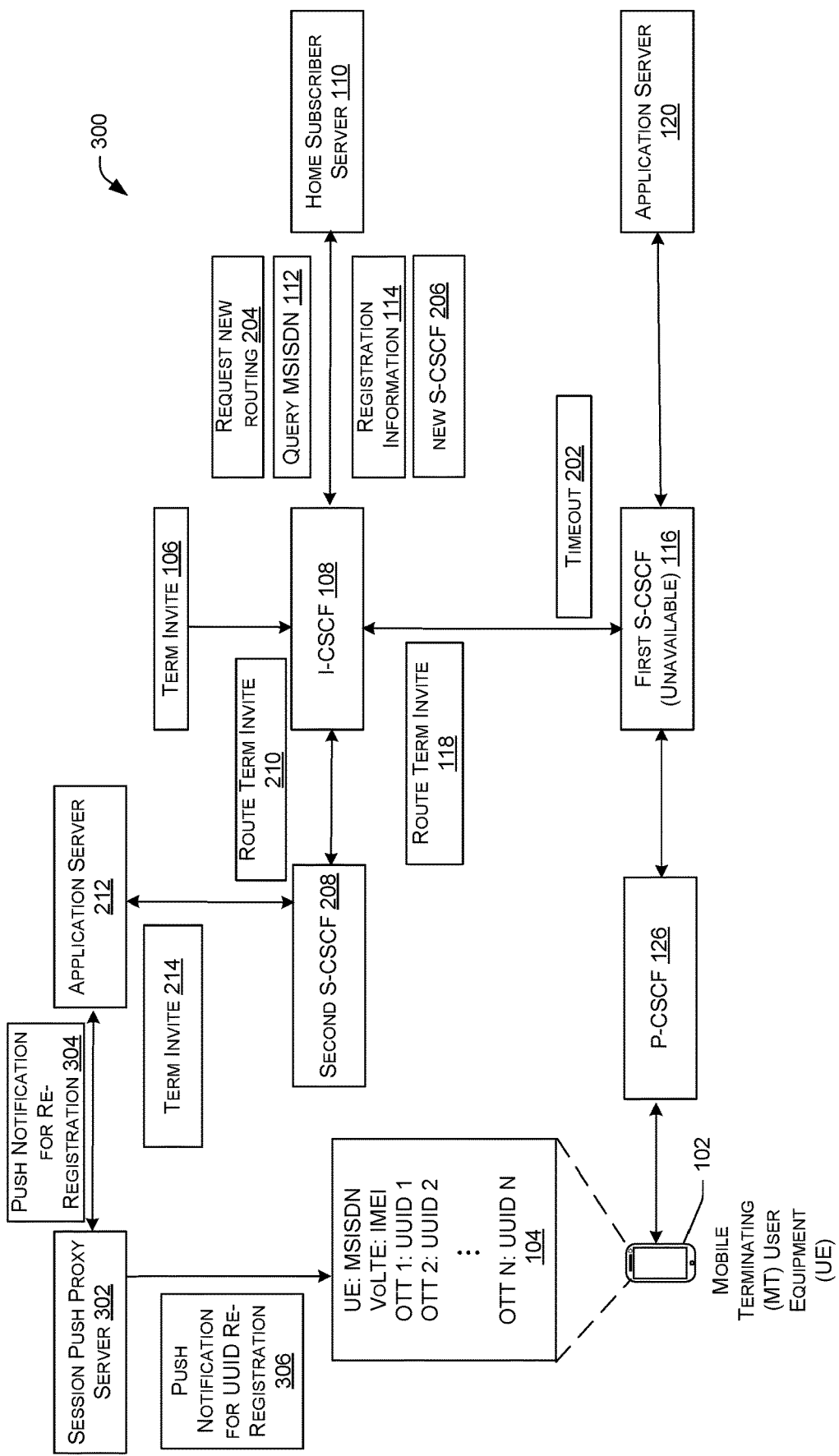
FIG. 3 illustrates a schematic diagram of an example environment where OTT services to the MT UE of FIG. 1 is restored when a session is to be opened with the MT UE, in accordance with examples of the disclosure.

FIG. 3 illustrates a schematic diagram of an example environment 300 where OTT services to the MT UE of FIG. 1 is restored when a session is to be opened with the MT UE 102, in accordance with examples of the disclosure. In a manner similar to the environment 200 of FIG. 2, in this scenario, the first S-CSCF 116 may be down or otherwise unavailable. When the term invite 106 is received by the I-CSCF 108, the I-CSCF 108 interacts with the HSS 110 to query the MSISDN 112 and, in response, receives registration information 114 from the HSS, as described in conjunction with FIG. 1. The registration information 114 indicates that the first S-CSCF is associated with the MT UE 102. As a result, the I-CSCF 108 attempts to route the term invite 118 to the first S-CSCF 116, but fails, since the first S-CSCF 116 is unavailable. The I-CSCF 108 receives and/or generates an indication of a timeout 202. Responsive to the timeout 202, the I-CSCF 108 may request new routing information 204 from the HSS 110. The HSS 110 may assign the second S-CSCF 208, to the MT UE 102. However, similar to the scenario described in conjunction with FIG. 2, at this point, the second S-CSCF 208 is not aware of the P-CSCF 126 that is associated with the MT UE 102.

The I-CSCF 108, after receiving an indication of the second S-CSCF 208, may route the term invite 210 to the second S-CSCF 208. The second S-CSCF 208 may then route the term invite 214 to the application server 212. Although a new application server 212 is depicted here as receiving the term invite 214, in other cases, the second S-CSCF 208 may send the term invite to the original application server 120. The term invite may include an identity, such as the IMEI and/or the MSISDN, associated with the MT UE 102. The application server 212 may identify and/or determine, from the term invite, the identity of the MT UE 102, such as by way of the IMEI associated with the MT UE 102. The application server 212 may further identify and/or determine that the MSISDN and/or the related IMEI is associated with one or more OTTs. In other words, the application server 212 may have information that indicates whether the MT UE 102 is associated with OTT services.

If the application server 212 determines that the MSISDN associated with the term invite is unregistered and further determines that the MSISDN is associated with OTT services, the application server 212 may send, to a secure push proxy server 302 (hereinafter referred to as SPP 302), a push notification for reregistration 304. In other words, the application server 212 may generate the push notification for registration 304 based at least in part on identifying that an MSISDN associated with a term invite is unregistered and further based at least in part on an indication that the MT UE 102 associated with the MSISDN is associated with a OTT services. The push notification for reregistration 304 may include an indication of an identity of the MT UE 102, such as the corresponding IMEI and/or the MSISDN. It should be understood that in some cases, the application server 212 may not have information about which ones and/or types of OTTs (e.g., WHATSAPP, TWITTER, WECHAT, etc.) and/or how many OTTs are associated with the MSISDN indicated in the term invite 214. Rather, in these cases, the application server 212 may have information that indicate whether the MSISDN indicated in the term invite 214 has any OTT services associated therewith or not.

The push notification 304 may be in the form of a hypertext transfer protocol (HTTP) message that is sent to the SPP 302. In some cases, the push notification for registration 304 may be a HTTP secure (HTTPS) message that is sent to the SPP 302. In other cases, the push notification for registration may be in the form of any other suitable format. The push notification for registration 304, in some cases, may include any suitable type of transport layer security (TLS) encryption, secure socket layer (SSL) encryption, or the like. In some cases, the push notification for reregistration 304 may be sent directly from the application server 212 to the SPP 302. In other cases, there may be one or more intermediary nodes and/or servers/systems that relay the push notification for registration 304 from the application server 212 to the SPP 302.

While the application server 212 is generating and sending the push notification for reregistration 304 to the SPP 302, the application server 212 may not act upon the term invite 214, which prompted the mechanism of generating and sending the push notification for registration 304, that the application server 212 received from the second S-CSCF 208. In other words, the application server 212 may not generate and/or send a service invite 216, responsive to the received term invite 214, as was the case in environment 200 of FIG. 2, where OTT services could not be provided to the MT UE 102. Instead, the application server 212 may wait to send the service invite 216 until the application server 212 identifies that at least one of the OTT applications operating on the MT UE 102 have been reregistered with the mobile network. The reregistration mechanism and subsequent issuance of a service invite by the application server 212 is described in greater detail with conjunction with FIG. 4.

The SPP 302, based at least in part on receiving the push notification for reregistration 304 from the application server 212, may generate one or more push notifications for UUID reregistration 306. The SPP 302 may have information about which OTT applications, as referenced by corresponding respective UUIDs, are associated with and/or operating on the MT UE 102. The SPP 302 may identify the MT UE 102, such as by the IMEI and/or MSISDN indicated in the push notification for reregistration 304 received from the application server 212. The SPP 302 may identify each of the OTTs, such as by corresponding UUIDs of the respective OTTs, such as by accessing a table and/or database of associations between IMEI and/or MSISDN to UUIDs, as maintained by the SPP 302. The table and/or database of these correspondences between the IMEI and/or MSISDN to UUIDs may be maintained and updated by the SPP 302 whenever new OTTs are set up and/or registered with the HSS 110 of the mobile network.

After identifying individual ones of the OTTs/UUIDs associated with the MT UE 102, the SPP may generate a push notification for UUID reregistration 306 for individual ones of the OTTs. Each of the push notification for UUID reregistrations 306 may indicate the OTT to which it corresponds, such as by including an indication of the corresponding UUID. The SPP 302 may send each of the push notification for UUID reregistration 306 to the MT UE 102 to cause the corresponding OTTs to reregister with the mobile network (e.g., with the elements on environment 300). The push notification for UUID reregistration 306 may include any variety of mechanisms to cause the corresponding OTT application operating on the MT UE 102 to reregister. For example, the push notification for UUID reregistration 306 may include an instruction to the corresponding OTT to reregister immediately. As another example, the push notification for UUID reregistration 306 may cause a time-to-live (TTL) setting corresponding to an OTT to be set to zero (or near zero) to cause the OTT to reregister with the mobile network. Indeed, any other suitable mechanism may be employed to cause the push notification for UUID reregistration 306 to compel the corresponding OTT to reregister.

Similar to the push notification 304, each of the push notification for UUID reregistration 306 may be in the form of a HTTP message that is sent to the MT UE 102. In some cases, the push notification for UUID registration 306 may be a HTTPS message that is sent from the SPP 302 to the MT UE 102. In other cases, the push notification for UUID registration 306 may be in the form of any other suitable format. The push notification for UUID registration 306, in some cases, may include any suitable type of TLS encryption, SSL encryption, or the like.

It should be appreciated that the mechanism disclosed herein, uses an out-of-band notification mechanism (e.g., the push notification mechanism) to communicate to the MT UE 102 and/or the OTTs operating thereon to reregister. Without reregistration of the OTTs, services cannot be provided to those OTTs operating on the MT UE 102. The reregistration of the OTTs, therefore, allows for restoration the OTT services associated with the MT UE 102, according to examples of the disclosure. In this case, the out-of-band push notifications to enable restoration of OTT services are generated responsive to an attempt to open a session with the MT UE 102 to provide OTT services to the user of the MT UE 102. Thus, this may be considered a passive mechanism, where restoration of the OTT services is not performed until there is a need to provide those services to the MT UE 102 and/or the OTT application. In this example, the application server 212 may wait to provide the requested OTT services, by opening a session with the MT UE 102, until the corresponding OTT reregisters, as will be described in more detail in correspondence to FIG. 4. As a result, of waiting for the reregistration of the corresponding OTT, there may be a relatively slight delay in providing the OTT service to the user of the MT UE 102. In some cases, this delay may be imperceptible to the user of the MT UE 102. In other cases, the user of the MT UE 102 may perceive the delay, but the relative inconvenience of that perceived delay may be substantially less than the inconvenience of not receiving the OTT services at all.

Figure 4:
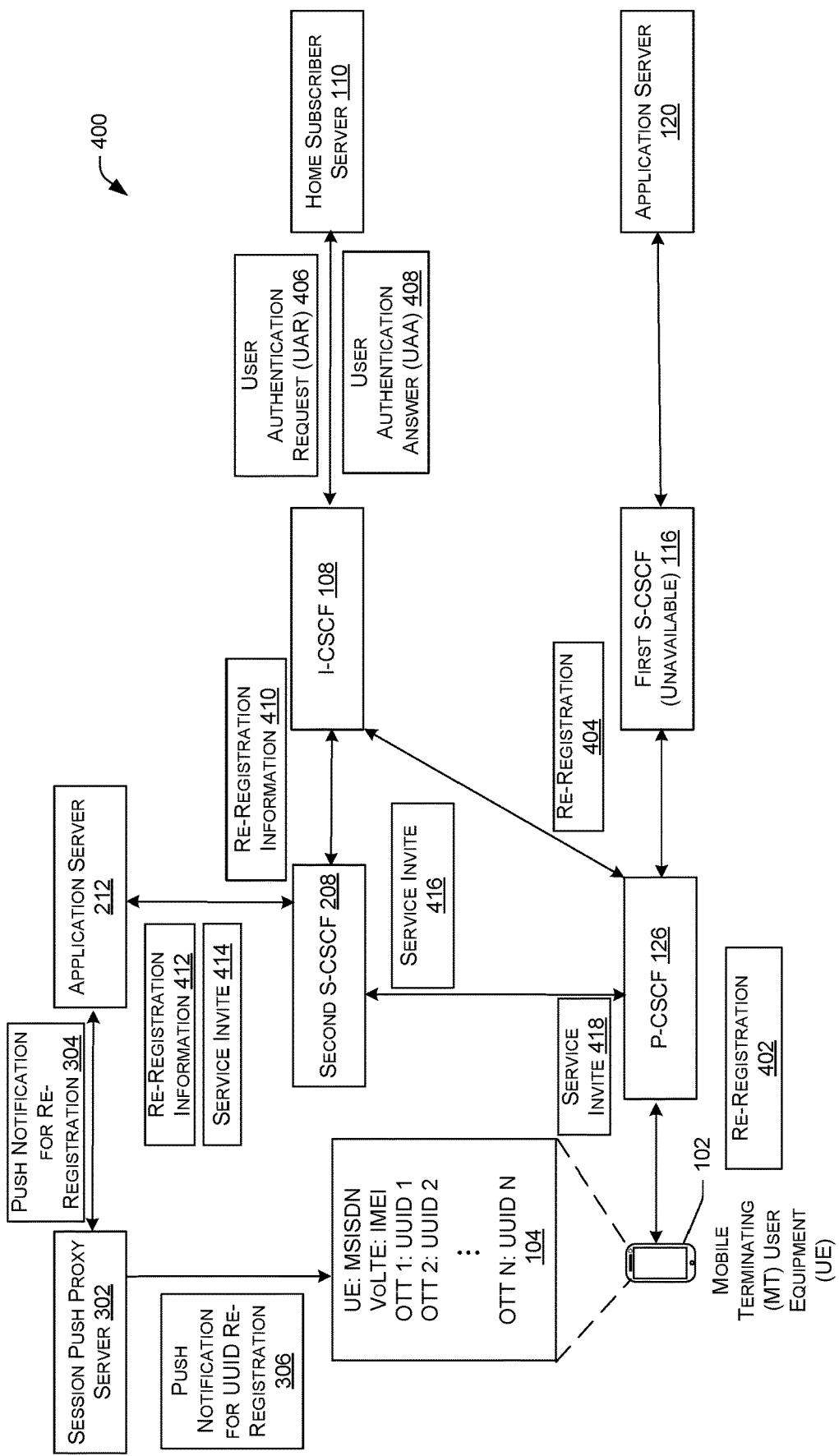
FIG. 4 illustrates a schematic diagram of an example environment where one or more OTTs reregister with the mobile network of FIG. 1, in accordance with examples of the disclosure.

FIG. 4 illustrates a schematic diagram of an example environment 400 where one or more OTTs reregister with the mobile network of FIG. 1, in accordance with examples of the disclosure. It should be noted that although a specific mechanism for the OTT applications to reregister is described herein, there may be any number of suitable mechanisms for the OTT to reregister with the mobile network, according to examples of the disclosure. For example, different mobile networks may have slight variations in the processes and/or the order of processes used to reregister OTT applications, with their corresponding UUIDs, on the mobile network.

As described in conjunction with FIG. 3, an OTT application operating on MT UE 102 may receive a corresponding push notification for UUID reregistration 306 from the SPP 302. Responsive to receiving the push notification for UUID reregistration 306, the OTT application may generate and/or send a request to reregister 402 to the P-CSCF 126. The P-CSCF 126 may route the request to reregister 404 to the I-CSCF 108. The I-CSCF 108 may generate and send a user authentication request (UAR) 406 to the HSS 110. Responsive to the UAR 406, the HSS may identify the OTT and/or the MT UE 102, verify services and/or network permissions associated with the OTT and/or the MT UE 102, and generate and send a user authentication answer (UAA) 408 to the I-CSCF 108. The I-CSCF 108 may forward reregistration information 410 to the second S-CSCF 208. The S-CSCF 208, by receiving this registration information is now aware of the P-CSCF 126 that is associated with the MT UE 102 and, therefore, the S-CSCF 208 can now route messages, such as service invites, to the MT UE 102.

The S-CSCF 208 may send reregistration information 412 to the application server 212. This process, in some cases, may be a third party registration (TPR) process. This type of TPR process may be initiated by the second S-CSCF 208 after the new S-CSCF (the second S-CSCF 208) has been registered, such as by SIP: Registration procedures. The reregistration information 412 may include an identity (e.g., UUID) of the OTT that is reregistered and may further include the identity (MSISDN and/or IMEI) of the MT UE 102. The reregistration information may still further include an identity of the second S-CSCF 208 that is now serving the MT UE 102 and the OTTs operating thereon. The reregistration information may yet further include authorized permissions and/or services that are to be provided to the MT UE and/or OTTs operating on the MT UE 102. Based on the reregistration information 412, the application server 212 is now aware that the OTT to which it is to provide services has been reregistered. As a result, the application server 212 may generate and send a service invite 414 to the second S-CSCF 208.

The second S-CSCF 208, now that it is aware of the P-CSCF 126 associated with the MT UE 102, may send the service invite 416 to the P-CSCF 126. The P-CSCF 126 may then route the service invite 418 to the MT UE 102 to provide to the OTT application with which the incoming OTT service is associated. The routing of the service invite 418 to the MT UE 102 may cause the MT UE 102 to open a session with the mobile network to receive OTT services. Thus, the operations of the application server 212 and the SPP 302 enable the reregistration of the OTTs operating on the MT UE 102 so that those OTTs can receive services from the mobile network.

Figure 5:
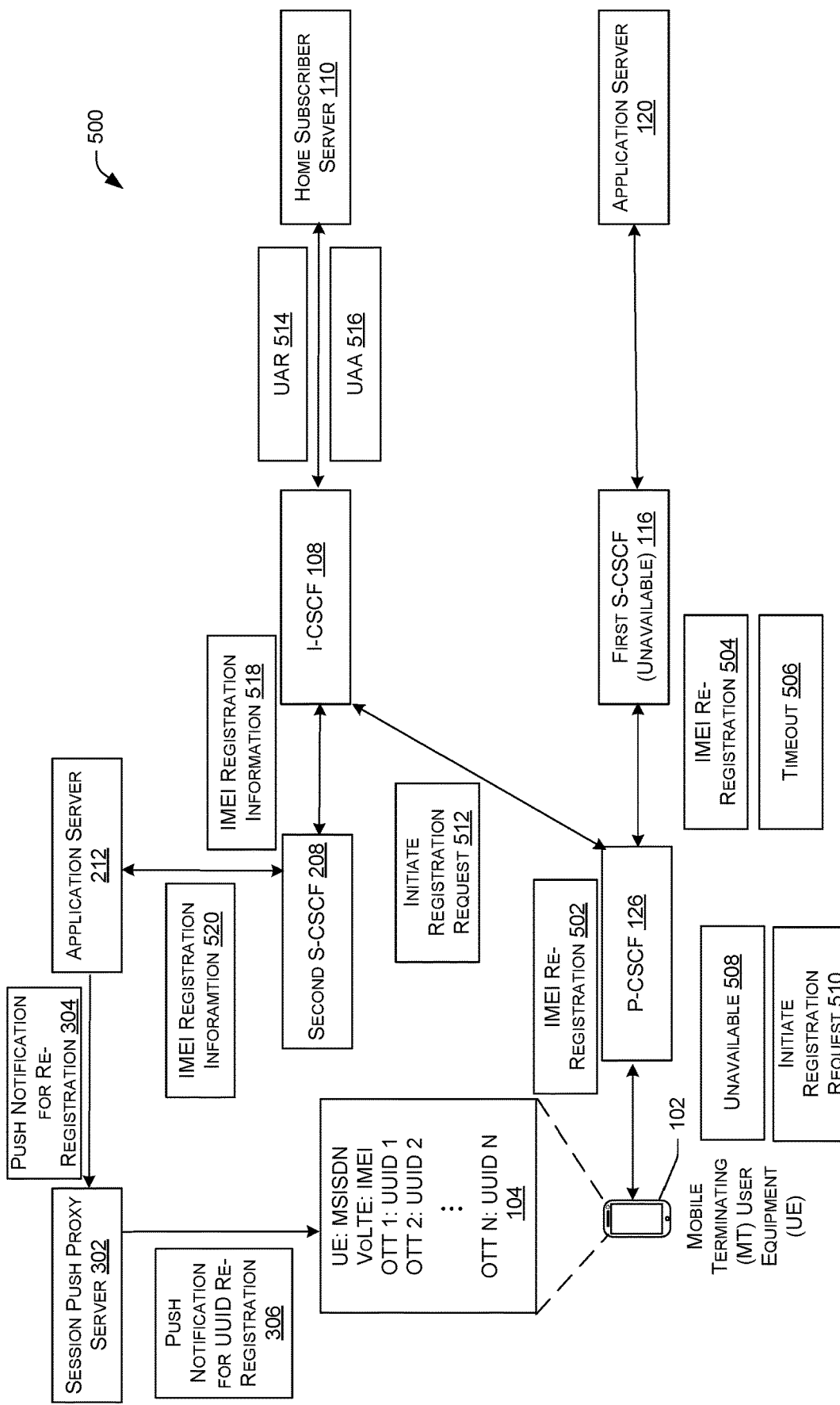
FIG. 5 illustrates a schematic diagram of an example environment where OTT services to the MT UE of FIG. 1 is restored when a corresponding international mobile equipment identity (IMEI) of the MT UE is reregistered, in accordance with examples of the disclosure.

FIG. 5 illustrates a schematic diagram of an example environment 400 where OTT services to the MT UE of FIG. 1 is restored when a corresponding international mobile equipment identity (IMEI) and/or MSISDN of the MT UE is reregistered, in accordance with examples of the disclosure. In this example, unlike in the scenario of environment 300 of FIG. 3, the reregistration of the OTTs operating on the MT UE 102 may not be prompted by needing to immediately provide OTT services to the user of the MT UE 102. Rather, the prompt for causing the OTTs to reregister may be when the associated IMEI is reregistered for the MT UE 102. As discussed herein, the IMEI may reregister on a relatively frequent basis (e.g., every 30 minutes, every hour, every 3 hours, etc.) compared to the OTT time between registration (e.g., 3 days, 7 days, 10 days, etc.). As a result, it is likely that the MSISDN and/or IMEI will be reregistered before any OTT services are to be provided to the OTT applications operating on the MT UE 102.

The MT UE 102 may initiate the IMEI reregistration process by generating and sending an IMEI reregistration request 502 to the P-CSCF 126. The P-CSCF 126 may forward the IMEI reregistration request to the first S-CSCF 116, which is now unavailable. As a result, the first S-CSCF 116 either sends a message indicating that it is unavailable or timeout (e.g., SIP: 4xx/5xx/timeout, etc.) 506 back to the P-CSCF 126. The P-CSCF 126 may send a message indicating unavailability 508 (e.g., SIP: 480) to the MT UE 102. In response, the MT UE 102 may initiate anew registration by sending an initiate registration request 510 to the P-CSCF 126. The P-CSCF 126 may route the initiate registration request 512 to the I-CSCF 108. The I-CSCF 108 may proceed with the UAR 514/UAA 516 process with the HSS 110, as described in conjunction with FIG. 4. The I-CSCF 108 may then provide IMEI registration information 518 to the second S-CSCF 208, which now serves the MT UE 102. The registration information 518 may include user profile information, as received from the HSS 110, such as services offered to the MSISDN and/or IMEI associated with the MT UE 102. This IMEI registration information may prompt a TPR on the application server 212 and the MT UE 102, with its IMEI, is now registered with the application server 212. In some cases, the processes of 510 may not be performed, and instead, the P-CSCF 126 may initiate a the new registration on behalf of the MT UE 102 without the MT UE 102 having to explicitly send the initiate registration request 510.

The application server 212, based at least in part on receiving the IMEI registration information 520, may identify that the MT UE 102 is associated with at least one OTT service. If the application server 212 determines that the IMEI is associated with OTT services, then the application server 212 may perform similar operations as described in conjunction with FIG. 3 herein. For example, the application server 212 may generate and send, to the SPP 302, a push notification for reregistration 304 based at least in part on identifying an indication that the MT UE 102 associated with the IMEI is associated with a OTT services. The push notification for reregistration 304 may include an indication of an identity of the MT UE 102, such as the corresponding IMEI and/or the MSISDN. It should be understood that in some cases, the application server 212 may not have information about which ones and/or types of OTTs (e.g., FACEBOOK MESSENGER, TWITTER, TELEGRAM, etc.) and/or how many OTTs are associated with the IMEI indicated in the IMEI registration information 516. Rather, in these cases, the application server 212 may have information that indicate whether the IMEI indicated in the IMEI registration information 516 has any OTT services associated therewith or not.

The push notification 304 may be in the form of an HTTP message that is sent to the SPP 302. In some cases, the push notification for reregistration 304 may be a HTTPS message that is sent to the SPP 302. In other cases, the push notification for registration may be in the form of any other suitable format. The push notification for reregistration 304, in some cases, may include any suitable type of TLS encryption, SSL encryption, or the like. In some cases, the push notification for reregistration 304 may be sent directly from the application server 212 to the SPP 302. In other cases, there may be one or more intermediate nodes and/or servers/systems that relay the push notification for reregistration 304 from the application server 212 to the SPP 302.

The SPP 302, based at least in part on receiving the push notification for reregistration 304 from the application server 212, may generate one or more push notifications for UUID reregistration 306. The SPP 302 may have information about which OTT applications, as referenced by corresponding respective UUIDs, are associated with and/or operating on the MT UE 102. The SPP 302 may identify the MT UE 102, such as by the IMEI and/or MSISDN indicated in the push notification for reregistration 304 received from the application server 212. The SPP 302 may identify each of the OTTs, such as by corresponding UUIDs of the respective OTTs, such as by accessing a table and/or database of associations between IMEI and/or MSISDN to UUIDs, as maintained by the SPP 302. The table and/or database of these correspondences between the IMEI and/or MSISDN to UUIDs may be maintained and updated by the SPP 302 whenever new OTTs are set up and/or registered with the HSS 110 of the mobile network.

After identifying individual ones of the OTTs/UUIDs associated with the MT UE 102, the SPP 302 may generate a push notification for UUID reregistration 306 for individual ones of the OTTs. Each of the push notification for UUID reregistrations 306 may indicate the OTT to which it corresponds, such as by including an indication of the corresponding UUID. The SPP 302 may send each of the push notification for UUID reregistration 306 to the MT UE 102 to cause the corresponding OTTs to reregister with the mobile network (e.g., with the elements on environment 300). The push notification for UUID reregistration 306 may include any variety of mechanisms to cause the corresponding OTT application operating on the MT UE 102 to reregister. For example, the push notification for UUID reregistration 306 may include an instruction to the corresponding OTT to reregister immediately. As another example, the push notification for UUID reregistration 306 may cause a TTL setting corresponding to an OTT to be set to zero (or near zero) to cause the OTT to reregister with the mobile network. Indeed, any other suitable mechanism may be employed to cause the push notification for UUID reregistration 306 to compel the corresponding OTT to reregister.

Similar to the push notification 304, each of the push notification for UUID reregistration 306 may be in the form of a HTTP message that is sent to the MT UE 102. In some cases, the push notification for UUID registration 306 may be a HTTPS message that is sent from the SPP 302 to the MT UE 102. In other cases, the push notification for UUID registration 306 may be in any other suitable format. The push notification for UUID registration 306, in some cases, may include any suitable type of TLS encryption, SSL encryption, or the like.

As in the example described in conjunction with FIG. 3, it should be appreciated that the mechanism disclosed herein, uses an out-of-band notification mechanism (e.g., the push notification mechanism) to communicate to the MT UE 102 and/or the OTTs operating thereon to reregister. Without reregistration of the OTTs, services cannot be provided to those OTTs operating on the MT UE 102. The reregistration of the OTTs, therefore, allows for restoration the OTT services associated with the MT UE 102, according to examples of the disclosure. In this case, the out-of-band push notifications to enable restoration of OTT services are generated responsive to the MT UE 102 trying to reregister its IMEI and failing, and then having to initiate a new registration. Thus, this may be considered a active mechanism, where restoration of the OTT services is performed even though there is no current need to provide OTT services to the MT UE 102 and/or the OTT application. The OTT reregistration process may be substantially similar to that described in conjunction with FIG. 4 and will not be repeated here.

Figure 6:
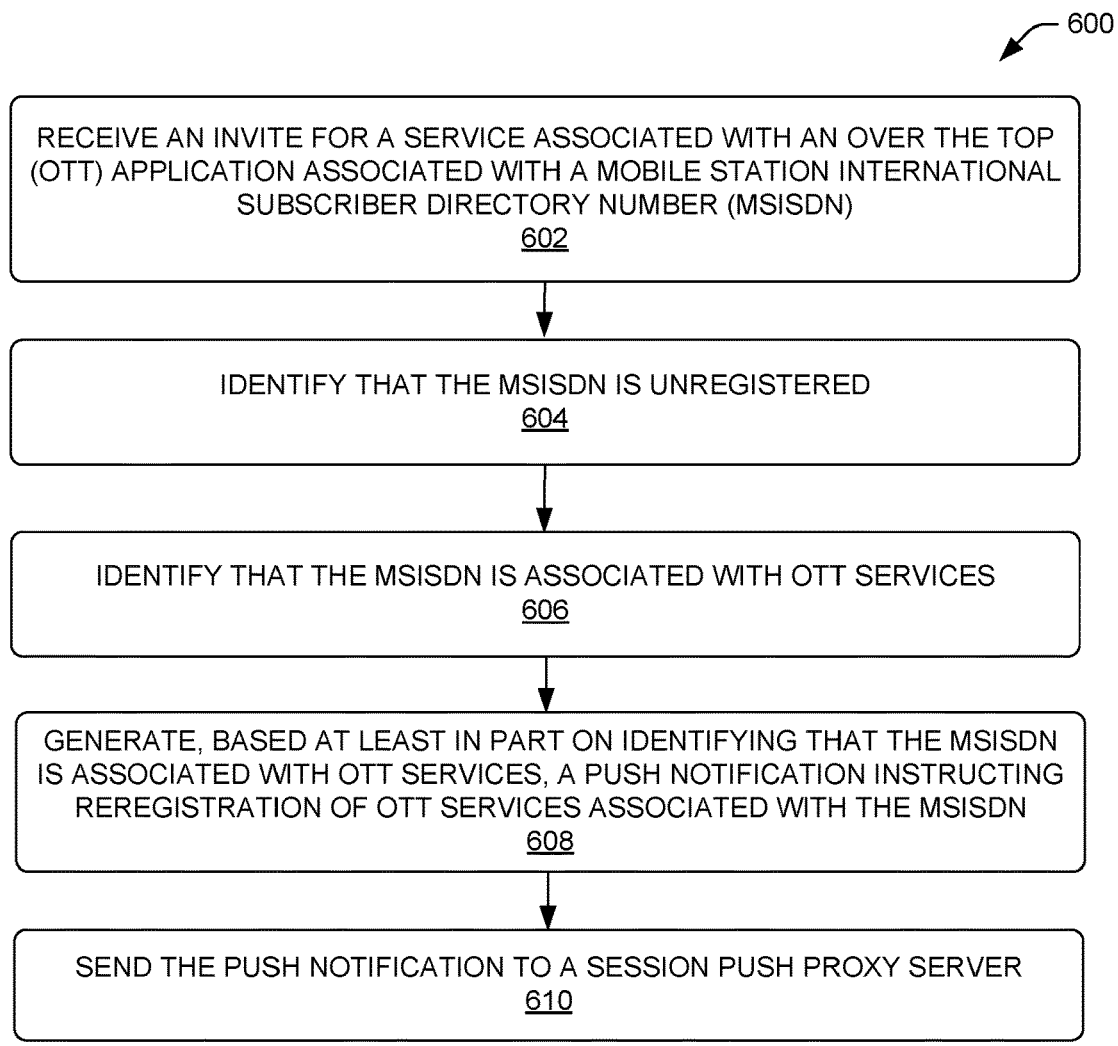
FIG. 6 illustrates a flow diagram of an example method by which an application server causes an OTT to reregister with the mobile network of FIG. 1 when a session is to be opened with the OTT, in accordance with examples of the disclosure.

FIG. 6 illustrates a flow diagram of an example method 600 by which an application server 212 causes an OTT to reregister with the mobile network of FIG. 1 when a session is to be opened with the OTT, in accordance with examples of the disclosure. The operations of method 600 may be performed by the application server 212, individually or in conjunction with one or more other entities of the mobile network. In some examples, the operations of method 600 may be the operations described in conjunction with FIG. 3 that are performed by the application server 212.

At block 602, an invite for a service associated with an OTT application associated with an MSISDN may be received. This invite may be a terminating invite to enable opening a session with the MT UE 102 to provide OTT services to the MT UE 102. As discussed herein, the term invite may include an identity, such as the IMEI and/or the MSISDN, associated with the MT UE 102.

At block 604, it may be identified that the MSISDN is unregistered. The application server 212 may extract the MSISDN and/or related IMEI information from the received term invite. This application server 212 will have an indication of those MSISDNs and/or IMEIs that have current registrations on the mobile network. This type of information may be provided to the application servers 212 of the mobile network from previous registrations and/or from the HSS 110. In the cases where the MSISDN is registered, the application server would proceed normally to provide OTT services to the OTT application corresponding to the term invite received. However, in this case, the application server 212 identifies that the MSISDN is not registered and, therefore, the mobile network may lack fresh information on how to route any OTT services to any of the OTTs associated with the MSISDN.

At block 606, it may be determined that the MSISDN is associated with OTT services. It should be understood that the application server 212 may not have information about which ones and/or types of OTTs and/or how many OTTs are associated with the MSISDN indicated in the term invite. Instead, the application server 212 may have information that indicates whether the MSISDN indicated in the term invite 214 has any OTT services associated with it. In this case, the application server 212 determines that the MSISDN is indeed associated with at least one OTT application.

At block 608, a push notification instructing reregistration of OTT services associated with the IMEI is generated based at least in part on identifying that the IMEI is associated with OTT services. The push notification may further be generated based at least in part on identifying that the IMEI is currently unregistered. This push notification 304 may provide instructions to the SPP 302 to generate and send another push notification corresponding to each of the OTT applications associated with the IMEI to cause those OTT applications to reregister with the mobile network.

At block 610, the push notification may be sent to a SSP. The push notification 304 may be in the form of a HTTP message that is sent to the SPP 302. In some cases, the push notification for registration 304 may be a HTTPS message that is sent to the SPP 302. In other cases, the push notification for registration may be in the form of any other suitable format. The push notification for registration 304, in some cases, may include any suitable type of TLS encryption, SSL encryption, or the like.

The SPP 302, upon receiving the push notification 304, may send additional push notifications to individual ones of the OTTs associated with the MT UE 102 to cause them to reregister with the mobile network. This reregistration enables the restoration of the OTT services. In the meantime, the application server 212 may wait for the reregistration of the OTT application for which it received a term invite, before the application server 212 sends that OTT a service invite to open a session with the mobile network to receive OTT services.

It should be noted that some of the operations of method 600 may be performed out of the order presented, with additional elements, and/or without some elements. Some of the operations of method 600 may further take place substantially concurrently and, therefore, may conclude in an order different from the order of operations shown above.

Figure 7:
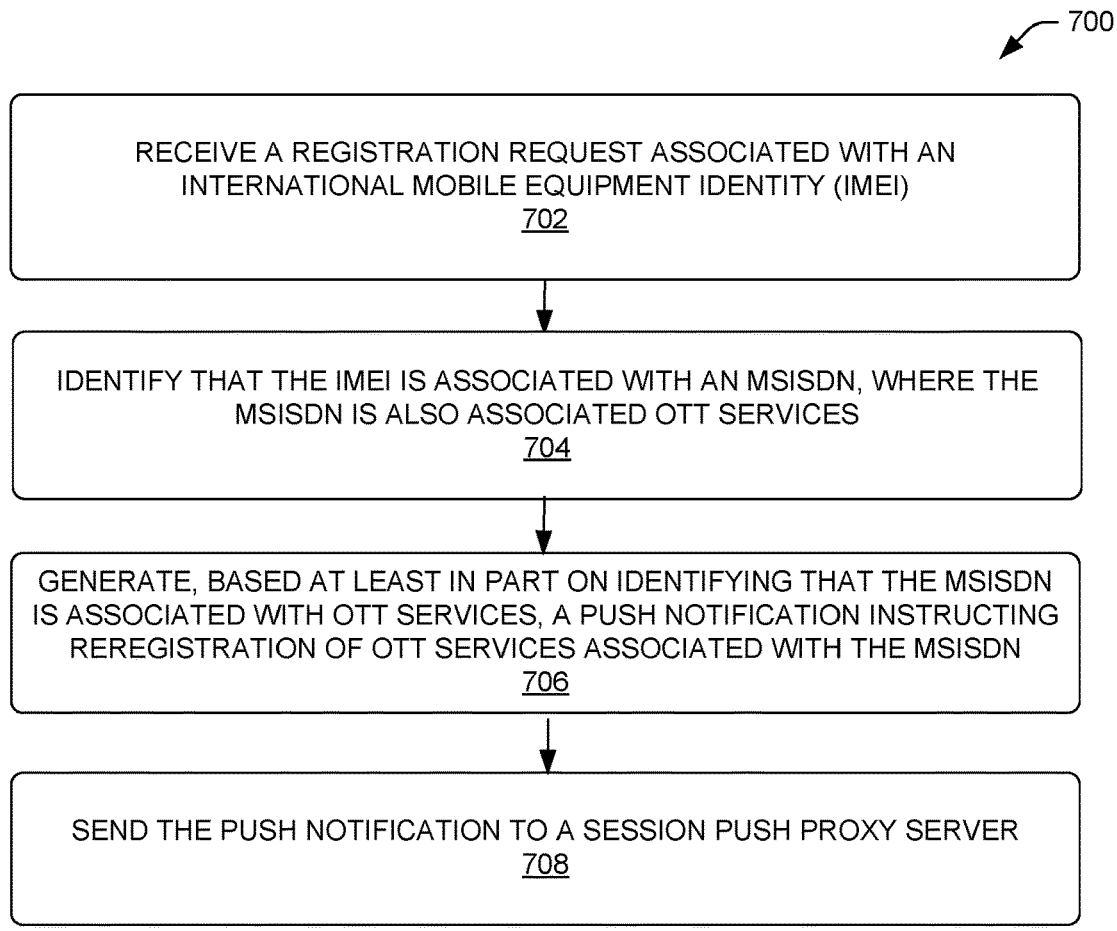
FIG. 7 illustrate a flow diagram of an example method by which an application server causes an OTT to reregister with the mobile network of FIG. 1 when a corresponding IMEI of the MT UE on which the OTT operates is reregistered, in accordance with examples of the disclosure.

FIG. 7 illustrate a flow diagram of an example method 700 by which an application server 212 causes an OTT to reregister with the mobile network of FIG. 1 when a corresponding IMEI and/or MSISDN of the MT UE 102 on which the OTT operates is reregistered, in accordance with examples of the disclosure. The operations of method 700 may be performed by the application server 212, individually or in conjunction with one or more other entities of the mobile network. In some cases, the operations of method 700 may be the operations described in conjunction with FIG. 5 that are performed by the application server 212.

At block 702, a registration request associated with an IMEI may be received. This registration request may be prompted by the MT UE 102 requesting registration with the mobile network after discovering that its previous registration is stale and/or ineffectual. It should be noted that the IMEI of the MT UE 102 is usually reregistered with a relatively high frequency relative to the OTTs associated with the same MT UE 102.

At block 704, it may be identified that the IMEI is associated with an MSISDN with which OTT services are also associated. It should be understood that the application server 212 may not have information about which ones and/or types of OTTs and/or how many OTTs are associated with the IMEI and/or MSISDN indicated in the term invite. Instead, the application server 212 may have information that indicates whether the IMEI and/or MSISDN indicated in the term invite 214 has any OTT services associated with it. In this case, the application server 212 determines that the IMEI and/or MSISDN is indeed associated with at least one OTT application.

At block 706, a push notification instructing reregistration of OTT services associated with the MSISDN may be generated based at least in part on identifying that the MSISDN is associated with OTT services. This push notification 304 may provide instructions to the SPP 302 to generate and send another push notification corresponding to each of the OTT applications associated with the MSISDN to cause those OTT applications to reregister with the mobile network.

At block 708, the push notification may be sent to a SSP. The push notification 304 may be in the form of a HTTP message that is sent to the SPP 302. In some cases, the push notification for registration 304 may be a HTTPS message that is sent to the SPP 302. In other cases, the push notification for registration may be in the form of any other suitable format. The push notification for registration 304, in some cases, may include any suitable type of TLS encryption, SSL encryption, or the like.

The SPP 302, upon receiving the push notification 304, may send additional push notifications to individual ones of the OTTs associated with the MT UE 102 to cause them to reregister with the mobile network. This reregistration enables the restoration of the OTT services. In the meantime, the application server 212 may wait for the reregistration of the OTT application for which it received a term invite, before the application server 212 sends that OTT a service invite to open a session with the mobile network to receive OTT services.

It should be noted that some of the operations of method 700 may be performed out of the order presented, with additional elements, and/or without some elements. Some of the operations of method 700 may further take place substantially concurrently and, therefore, may conclude in an order different from the order of operations shown above.

Figure 8:
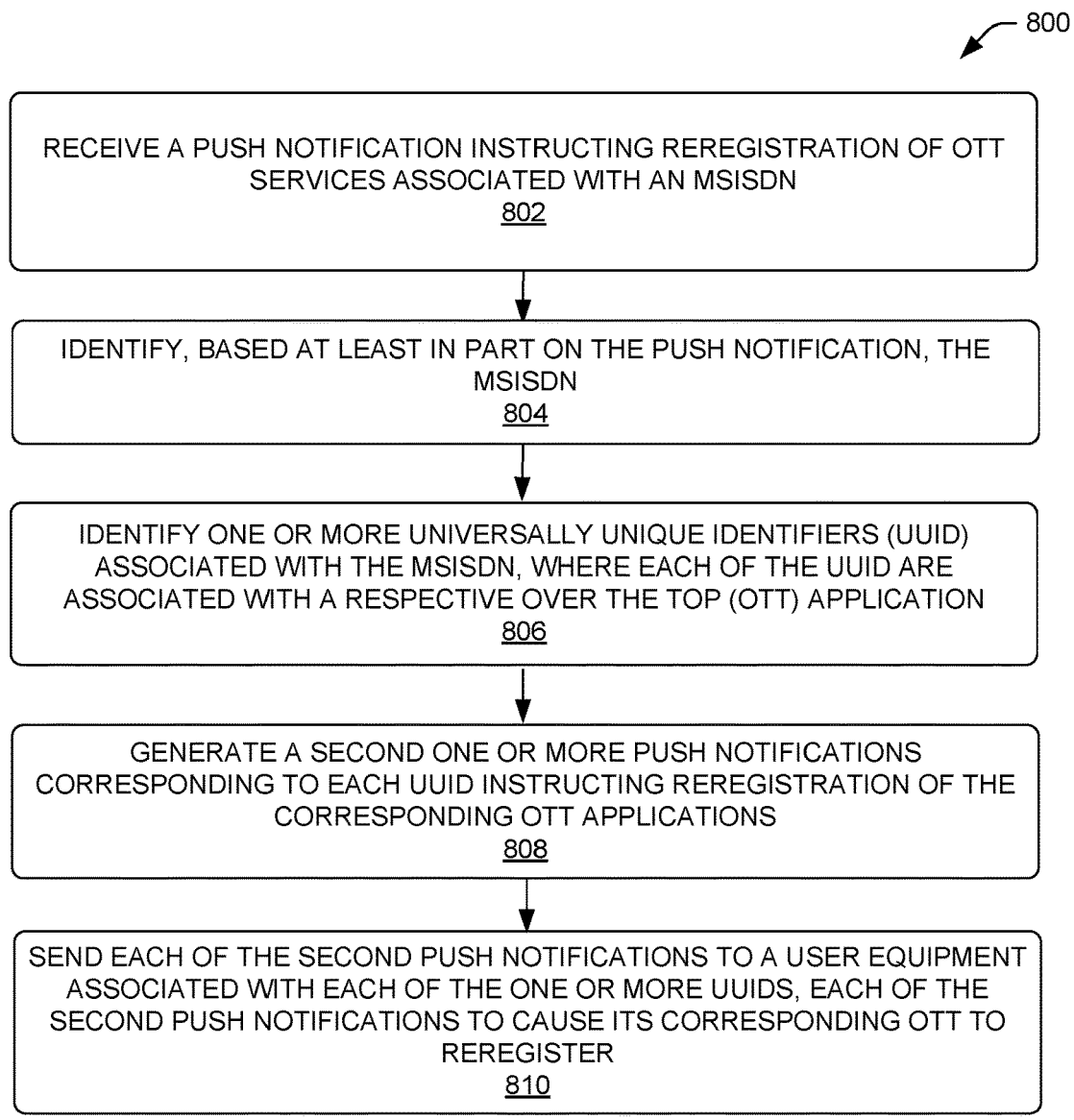
FIG. 8 illustrates a flow diagram of an example method by which a secure push proxy (SPP) server causes an OTT to reregister with the mobile network of FIG. 1, in accordance with examples of the disclosure.

FIG. 8 illustrates a flow diagram of an example method by which a secure push proxy (SPP) system causes an OTT to reregister with the mobile network of FIG. 1, in accordance with examples of the disclosure. The operations of method 800 may be performed by the SPP 302, individually or in conjunction with one or more other entities of the mobile network. In some cases, the operations of method 800 may be the operations described in conjunction with FIGS. 3 and 5 that are performed by the SPP 302.

At block 802, a push notification instructing reregistration of OTT services associated with an MSISDN may be received. The push notification 304 may be in the form of a HTTP message that is received from the application server 212. In some cases, the push notification for registration 304 may be a HTTPS message. In other cases, the push notification for registration may be in any other suitable format. The push notification for registration 304, in some cases, may include any suitable type of TLS encryption, SSL encryption, or the like. The received push notification 304 may not include any indication or particular OTT services and/or OTT applications. Instead, the push notification 304 may instruct the SPP 302 to instruct all OTT applications associated with the MSISDN to reregister.

At block 804, the MSISDN may be identified based at least in part on the push notification. The MSISDN may be indicated in the push notification 304 itself, as received from the application server 212.

At block 806, one or more UUIDs associated with the MSISDN may be identified. These individual UUIDs may be associated with corresponding respective OTT applications operating on the MT UE 102. The SPP 302 may include a database that stores the associations between the MSISDN and/or IMEI and the corresponding UUIDs. The SPP 302 may access this database to identify individual ones of the UUIDs associated with the MSISDN, as indicated in the received push notification 304.

At block 808, one or more second push notifications corresponding to each UUID may be generated, where each of the one or more second push notifications instruct the corresponding OTT application to reregister with the mobile network. Each of the push notification for UUID reregistrations 306 may indicate the OTT to which it corresponds, such as by including an indication of the corresponding UUID. The one or more push notification for UUID reregistration 306 may include any variety of mechanisms to cause the corresponding OTT application operating on the MT UE 102 to reregister. For example, the push notification for UUID reregistration 306 may include an instruction to the corresponding OTT to reregister immediately. As another example, the push notification for UUID reregistration 306 may cause a TTL setting corresponding to an OTT to be set to zero (or near zero) to cause the OTT to reregister with the mobile network. Indeed, any other suitable mechanism may be employed to cause the push notification for UUID reregistration 306 to compel the corresponding OTT to reregister.

At block 810, each of the second push notifications may be sent to a UE associated with each of the one or more UUIDs, where each of the second push notifications cause its corresponding OTT to reregister with the mobile network. This reregistration allows for OTT services to be restored after a disruption due to a S-CSCF 116, 208 becoming unavailable. The SPP 302 may send each of the push notification for UUID reregistration 306 to the MT UE 102 and the OTT applications cooperate with the MT UE 102 to reregister with the mobile network (e.g., with the elements in environment 400).

It should be noted that some of the operations of method 800 may be performed out of the order presented, with additional elements, and/or without some elements. Some of the operations of method 800 may further take place substantially concurrently and, therefore, may conclude in an order different from the order of operations shown above.

Figure 9:
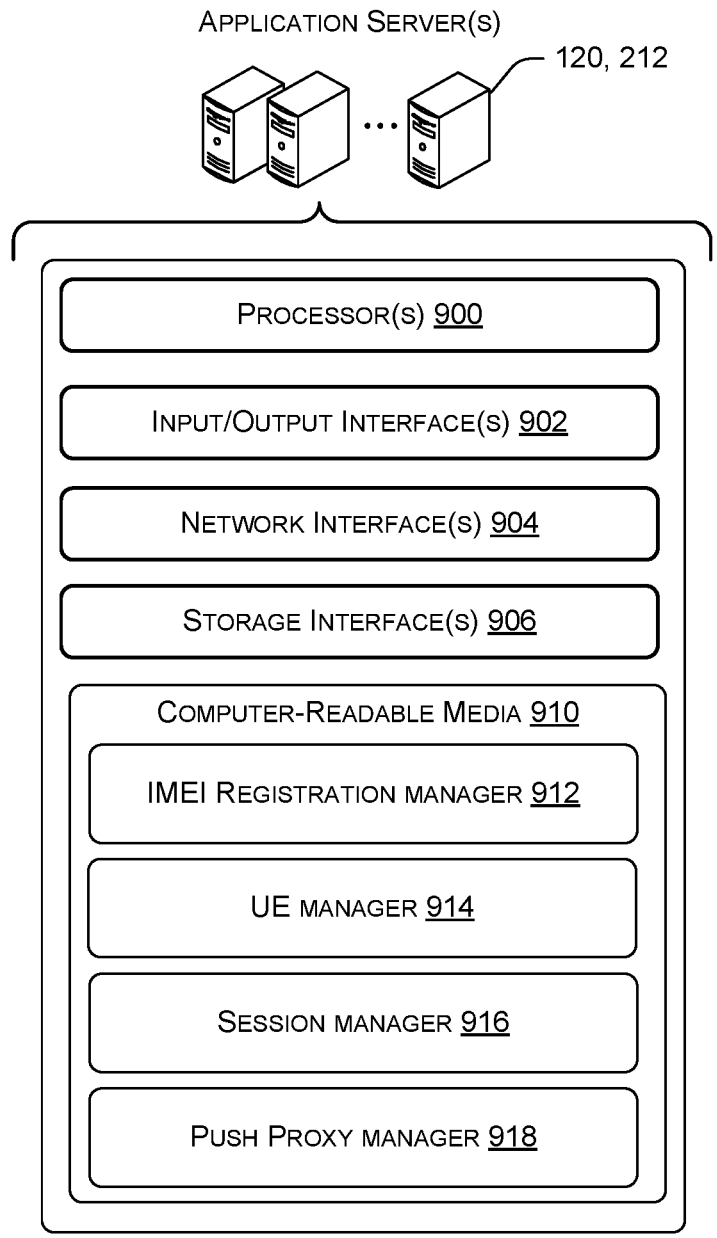
FIG. 9 illustrates a block diagram of an example application server that may enable a restoration of OTT services, in accordance with examples of the disclosure.

FIG. 9 illustrates a block diagram of an example application server 120, 212 that may enable a restoration of OTT services, in accordance with examples of the disclosure. The application server 120, 212 may include one or more processor(s) 900, one or more input/output (I/O) interface(s) 902, one or more network interface(s) 904, one or more storage interface(s) 906, and computer-readable media 910.

In some implementations, the processors(s) 900 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 900 may possess its own local memory, which also may store program modules, program data, and/or one or more operating systems. The one or more processor(s) 900 may include one or more cores.

The one or more input/output (I/O) interface(s) 902 may enable the application server 120, 212 to detect interaction with other mobile network components and/or with operators of the mobile network. The network interface(s) 904 may enable the application server 120, 212 to communicate via the one or more network(s). The network interface(s) 904 may include a combination of hardware, software, and/or firmware and may include software drivers for enabling any variety of protocol-based communications, and any variety of wireline and/or wireless ports/antennas. For example, the network interface(s) 904 may comprise one or more of a cellular radio, a wireless (e.g., IEEE 802.1x-based) interface, a Bluetooth® interface, and the like. The storage interface(s) 906 may enable the processor(s) 900 to interface and exchange data with the computer-readable medium 910, as well as any storage device(s) external to the application server 120, 212. The storage interface(s) 906 may further enable access to removable media.

The computer-readable media 910 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 910 may be implemented as computer-readable storage media (CRSM), which may be any available physical media accessible by the processor(s) 900 to execute instructions stored on the computer-readable media 910. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 900. The computer-readable media 910 may have an operating system (OS) and/or a variety of suitable applications stored thereon. The OS, when executed by the processor(s) 900 may enable management of hardware and/or software resources of the application server 120, 212.

Several components such as instruction, data stores, and so forth may be stored within the computer-readable media 910 and configured to execute on the processor(s) 900. The computer readable media 910 may have stored thereon an IMEI registration manager 912, a UE manager 914, a session manager 916, and a push proxy manager 918. It will be appreciated that each of the components 912, 914, 916, 918, may have instructions stored thereon that when executed by the processor(s) 900 may enable various functions for restoring OTT services after a failure of one or more S-CSCF 116, 208.

The instructions stored in the IMEI registration manager 912, when executed by the processor(s) 900, may configure the application server 120, 212 to receive IMEI and/or MSISDN registration information and register a corresponding MT UE 102 within the application server 120, 212 to enable providing services to the MT UE 102, including OTT services. The processor(s) 900 may further be configured to identify whether there are any OTT services associated with a particular IMEI and/or MSISDN. This correspondence information of MSISDN to an indication of any OTT services may be stored on the IMEI registration manager 912 on the computer-readable media 910. Alternatively, the MSISDN to OTT service correspondence information may be stored in an a separate datastore. As described herein, when a MT UE 102 attempts to register its IMEI, the processor(s) 900 may identify whether the related MSISDN has corresponding OTT services, and if it does, then the processor(s) 900 may generate a push notification to cause the OTT services to reregister with the mobile network.

The instructions stored in the UE manager 914, when executed by the processor(s) 900, may configure the application server 120, 212 to cooperate with other elements of environments 300, 400, 500 to provide services, such as OTT services to any variety of MT UEs 102 that are registered with the mobile network. The processor(s) in some cases, may be configured to determine if an OTT to which services are to be provided is currently not registered. In some cases, the processor(s) 900 may be configured to make this determination by determining whether corresponding IMEI and/or MSISDN of the MT UE 102 is currently registered with the application server 120, 212 and/or the rest of the mobile network.

The instructions stored in the session manager 916, when executed by the processor(s) 900, may configure the application server 120, 212 to open a session with an MT UE 102 to provide any variety of services to the MT UE 102, including OTT services. The processor(s) 900 may be configured to identify when a particular OTT application and/or its corresponding MSISDN is not properly registered with the application server 120, 212 or the rest of the mobile network. In this case, the processor(s) 900 may be configured to delay issuing a service invite (e.g., an SIP: Invite) until the associated OTT application reregisters with the application server 120, 212, such as by a third party registration process. The processor(s) 900 may further be configured to initiate the process of causing unregistered OTT applications to reregister with the mobile network.

The instructions stored in the push proxy manager 918, when executed by the processor(s) 900, may configure the application server 120, 212 to identify when OTT applications associated with a particular IMEI and/or MSISDN is to be prompted to reregister with the mobile network to restore OTT services. The processor(s) 900 may identify, such as based on determining that a particular IMEI registering and further based on identifying that the corresponding MSISDN has associated OTT services, for a MT UE 102 that OTT applications are to be reregistered. The processor(s) 900 may further determine that OTT applications associated with a MT UE 102 are to reregister with the mobile network based at least in part on the OTT service that is to be provided to the corresponding OTT application and/or its corresponding IMEI/MSISDN being unregistered with the application server 120, 212 and/or the rest of the mobile network. The processor(s) 900 may generate a push notification (e.g., HTTP message, HTTPS message, etc.) to cause the OTT applications associated with a MT UE 102 to reregister with the application server 120, 212 and/or the mobile network. The push notification may be sent to the SPP 302 to prompt the SPP 302 to generate additional individual push notifications for each OTT application associated with the MT UE 102.

Figure 10:
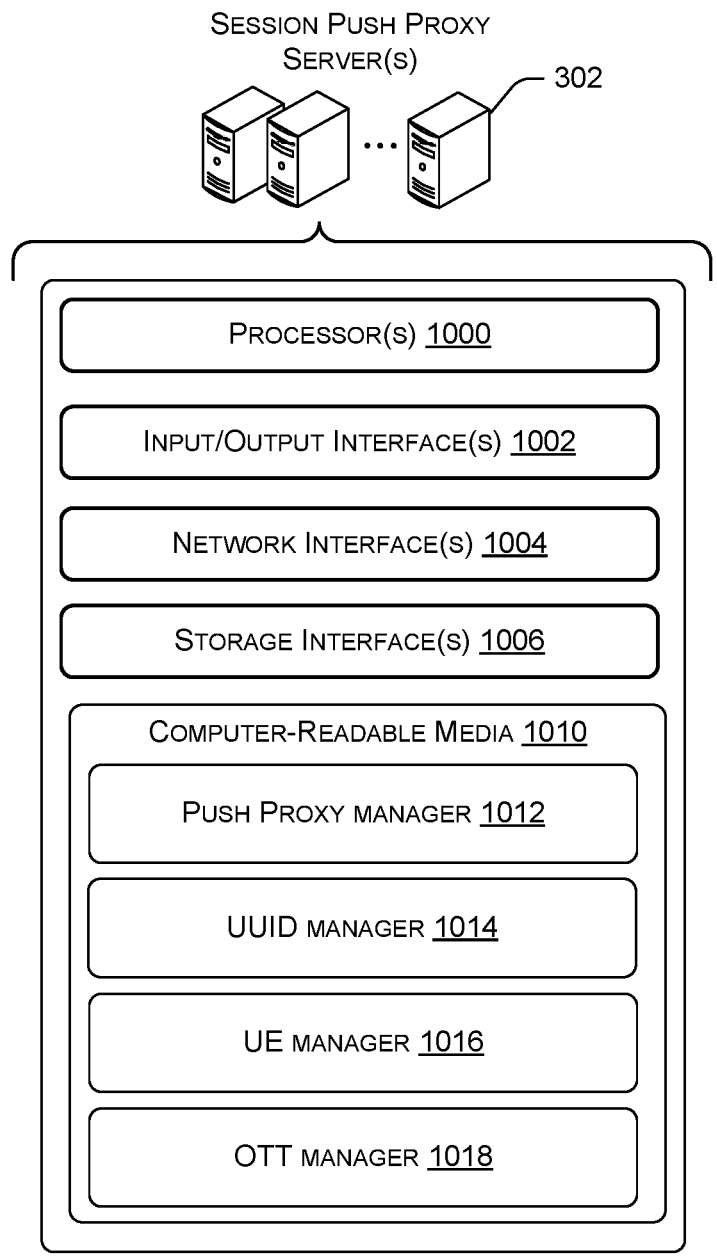
FIG. 10 illustrates a block diagram of an example SPP system that may enable a restoration of OTT services, in accordance with examples of the disclosure.

FIG. 10 illustrates a block diagram of an example SPP system 302 that may enable a restoration of OTT services, in accordance with examples of the disclosure. The SPP 302 may include one or more processor(s) 1000, one or more input/output (I/O) interface(s) 1002, one or more network interface(s) 1004, one or more storage interface(s) 1006, and computer-readable media 1010. The descriptions of the one or more processor(s) 1000, the one or more input/output (I/O) interface(s) 1002, the one or more network interface(s) 1004, the one or more storage interface(s) 1006, and the computer-readable media 1010 may be substantially similar to the descriptions of the one or more processor(s) 900, the one or more input/output (I/O) interface(s) 902, the one or more network interface(s) 904, the one or more storage interface(s) 906, and the computer-readable media 910, respectively, as described in FIG. 9 with respect to the application server 120, 212, and in the interest of brevity, will not be repeated here.

Several modules such as instruction, data stores, and so forth may be stored within the computer-readable media 1010 and configured to execute on the processor(s) 1000. The computer readable media 1010 may have stored thereon a push proxy manager 1012, a UUID manager 1014, a UE manager 1016, and an OTT manager 1018. It will be appreciated that each of the modules 1012, 1014, 1016, 1018, may have instructions stored thereon that when executed by the processor(s) 1000 may enable various functions pertaining to the operations of the SPP 302.

The instructions stored in the push proxy manager 1012, when executed by the processor(s) 1000, may configure the SPP 302 to receive a receive a push proxy message from the application server 120, 212 that instructs the SPP 302 to request individual OTT applications associated with a particular MT UE 102 to reregister with the mobile network to restore OTT services to those individual OTT applications. The processor(s) 1000 may be configured to identify a IMEI and/or MSISDN of a MT UE 102 from the push notification received from the application server 120, 212. The processor(s) 1000 may further be configured to generate push notifications for each of the OTT applications that are to be instructed to reregister to cause those OTT applications to reregister with the mobile network.

The instructions stored in the UUID manager 1014, when executed by the processor(s) 1000, may configure the SPP 302 to identify the UUIDs of OTT applications that are associated with an IMEI and/or MSISDN of a MT UE 102 for which OTT services are to be restored. The UUIDs may be stored in a table that associates those UUIDs to their corresponding MSISDN. In some cases, the UUID correspondence table may be stored in the UUID manager 1014 on the computer-readable media 1010. In other cases, the UUID correspondence table may be stored on a separate datastore.

The instructions stored in the UE manager 1016, when executed by the processor(s) 1000, may configure the SPP 302 to update a correspondence table that relates an MSISDN of a MT UE 102 with its UUIDs of corresponding OTT applications. This may be updated every time a new OTT application is used and/or downloaded onto a MT UE 102.

The instructions stored in the OTT manager 1018, when executed by the processor(s) 1000, may configure the SPP 302 to generate a push notification associated with each OTT application associated with a MT UE 102 to cause those OTT applications to reregister with the mobile network to restore OTT services. The processor(s) 1000 may generate and send the push notifications for reregistration to the OTT applications of the MT UEs 102 for which OTT services are to be restored.

Figure 11:
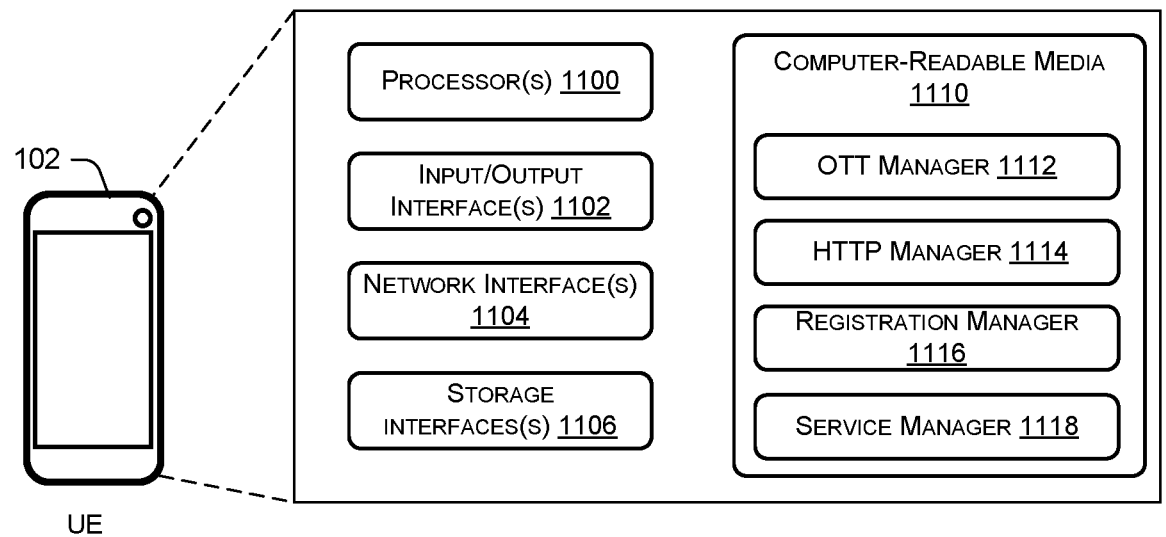
FIG. 11 illustrates a block diagram of an example UE that may be configured to reregister with a mobile network to restore OTT services corresponding to OTT application running on the UE, in accordance with examples of the disclosure.

FIG. 11 illustrates a block diagram of an example MT UE 102 that may be configured to reregister with a mobile network to restore OTT services corresponding to OTT application running on the MT UE 102, in accordance with examples of the disclosure.

In accordance with various examples disclosed herein, the terminating user equipment (UE), communication device, device, wireless communication device, wireless device, mobile device, terminal, wireless terminal, mobile terminal, and client device, may be used interchangeably herein to describe the MT UE 102. The MT UE 102 may be configured for transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.11x protocols, WiMAX, Wi-Fi, Data Over Cable Service Interface Specification (DOCSIS), digital subscriber line (DSL), and/or any future IP-based network technology or evolution of an existing IP-based network technology.

The MT UE 102 may include one or more processor(s) 1100, one or more input/output (I/O) interface(s) 1102, one or more network interface(s) 1104, one or more storage interface(s) 1106, and computer-readable media 1110. The descriptions of the one or more processor(s) 1100, the one or more input/output (I/O) interface(s) 1102, the one or more network interface(s) 1104, the one or more storage interface(s) 1106, and the computer-readable media 1110 may be substantially similar to the descriptions of the one or more processor(s) 900, the one or more input/output (I/O) interface(s) 902, the one or more network interface(s) 904, the one or more storage interface(s) 906, and the computer-readable media 910, respectively, as described in FIG. 9 with respect to the application server 120, 212, and in the interest of brevity, will not be repeated here.

Several modules such as instruction, data stores, and so forth may be stored within the computer-readable media 1110 and configured to execute on the processor(s) 1100. The computer readable media 1110 may have stored thereon an OTT manager 1112, an HTTP manager 1114, a registration manager 1116, and a service manager 1118. It will be appreciated that each of the modules 1112, 1114, 1116, 1118, may have instructions stored thereon that when executed by the processor(s) 1100 may enable various functions pertaining to the operations of the MT UE 102.

The instructions stored in the OTT manager 1112, when executed by the processor(s) 1100, may configure the MT UE 102 to operate a number of OTT applications thereon, with each OTT application having its own corresponding UUID. The processor(s) 1100 also enable receiving services for the OTT applications running on the MT UE 102.

The instructions stored in the HTTP manager 1114, when executed by the processor(s) 1100, may configure the MT UE 102 to receive push notification(s), such as from the SPP 302. These push notifications may include instructions, such as instructions to cause an OTT application to reregister on the mobile network.

The instructions stored in the registration manager 1116, when executed by the processor(s) 1100, may configure the MT UE 102 to register with the mobile network, such as by sending one or more requests to register. The processor(s) 1100 may also enable OTT applications operating on the MT UE 102 to reregister with the mobile network, such as for the purpose of restoring mobile services to the MT UE 102.

The instructions stored in the service manager 1118, when executed by the processor(s) 1100, may configure the MT UE 102 to provide one or more services to the user of the MT UE 102, including OTT services, as provided by the application server 120, 212 in association with a variety of other elements of the mobile network.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to examples of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some examples of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other examples, the databases shown can be integrated or distributed into any number of databases or other data storage devices.

Many modifications and other examples of the disclosure set forth herein will be apparent having the benefit of the teachings presented in the foregoing descriptions and the associated drawings. Therefore, it is to be understood that the disclosure is not to be limited to the specific examples disclosed and that modifications and other examples are intended to be included within the scope of the appended claims. Although specific terms are employed herein, they are used in a generic and descriptive sense only and not for purposes of limitation.

What is claimed is:

1. A system comprising:
one or more processors; and
one or more computer-readable media storing computer-executable instructions that, when executed by the one or more processors, cause the one or more processors to perform acts comprising:
receiving a registration request associated with a user equipment (UE);
determining, based at least in part on the registration request, that the UE is associated with over-the-top (OTT) services;
generating, based at least in part on the determining that the UE is associated with OTT services, a push notification; and
sending, to a secure push proxy (SPP) system, the push notification, wherein the push notification instructs to the SPP system to generate one or more second push notifications to instruct one or more OTT applications associated with the UE to reregister with a mobile network.

2. The system of claim 1, wherein the push notification is a hypertext transfer protocol (HTTP) message.

3. The system of claim 1, wherein the registration request indicates at least one of an international mobile equipment identity (IMEI) or a mobile station international subscriber directory number (MSISDN) associated with the UE.

4. The system of claim 3, wherein the acts further comprise:
determining that the UE is associated with the OTT services by accessing a database that associates the IMEI or the MSISDN with an indication of OTT services associated with the UE.

5. The system of claim 1, wherein the registration request is received on behalf of the UE from a first serving call session control function (S-CSCF) system associated with the UE after a second S-CSCF system previously associated with the UE became unavailable.

6. The system of claim 5, wherein the system is an application server associated with the UE by the first S-CSCF system.

7. The system of claim 5, wherein the acts further comprise:
generating a service invite associated with a first OTT application of the one or more OTT applications; and
send, to the first S-CSCF system, the service invite.

8. The system of claim 1, wherein the acts further comprise:
generating a second push notification associated with a first OTT application of the one or more OTT applications, the second push notification instructing the first OTT application to reregister with the mobile network;
sending the second push notification to the UE;
generating a third push notification associated with a second OTT application of the one or more OTT applications, the third push notification instructing the second OTT application to reregister with the mobile network; and
sending the third push notification to the UE.

9. A computer-implemented method, comprising:
receiving, by a secure push proxy (SPP) system and from an application server, a first push notification, the first push notification including a mobile station international subscriber directory number (MSISDN) associated with a user equipment (UE);
determining, by the SPP system and based at least in part on the MSISDN, that a first over-the-top (OTT) application is associated with the MSISDN;
generating, by the SPP system, a second push notification to cause the first OTT application to reregister with a mobile network to restore OTT services associated with the first OTT application; and
sending, by the SPP system and to the UE, the second push notification.

10. The computer-implemented method of claim 9, wherein the second push notification is a hypertext transfer protocol (HTTP) message.

11. The computer-implemented method of claim 9, wherein the second push notification includes instructions to the first OTT application to set a time to live (TTL) setting associated with a time remaining before registration to zero.

12. The computer-implemented method of claim 9, wherein determining that the first OTT application is associated with the MSISDN further includes accessing a correspondence table that relates the MSISDN to a universally unique identifier (UUID) associated with the first OTT application.

13. The computer-implemented method of claim 9, further comprising:
   determining, by the SPP system and based at least in part on the MSISDN, that a second OTT application is associated with the IMEI;
   generating, by the SPP system, a third push notification to cause the second OTT application to reregister with the mobile network to restore OTT services associated with the second OTT application; and
   sending, by the SPP system and to the UE, the third push notification.

14. The computer-implemented method of claim 9, further comprising:
   receiving, by the SPP system and from the application server, a second push notification, the second push notification including a second MSISDN associated with a second UE;
   determining, by the SPP system and based at least in part on the second MSISDN, that a second OTT application is associated with the second MSISDN;
   generating, by the SPP system, a second push notification to cause the second OTT application to reregister with the mobile network; and
   sending, by the SPP system and to the second UE, the second push notification.

15. A system comprising:
   one or more processors; and
   one or more computer-readable media storing computer-executable instructions
   that, when executed by the one or more processors, cause the one or more processors to perform acts comprising:
   receiving an invite message associated with an over-the-top (OTT) application, the invite message including at least one of an international mobile equipment identity (IMEI) or a mobile station international subscriber directory number (MSISDN) associated with the OTT application;
   determining that the OTT application is unregistered with a mobile network;
   generating, based at least in part on the determining that the OTT application is unregistered with the mobile network, a push notification; and
   sending, to a secure push proxy (SPP) system, the push notification, wherein the push notification instructs to the SPP system to generate one or more second push notifications to instruct one or more OTT applications associated with a user equipment (UE) to reregister with a mobile network, the one or more OTT applications including the OTT application.

16. The system of claim 15, wherein determining that the OTT application is unregistered with a mobile network comprises determining that the MSISDN is unregistered with the mobile network.

17. The system of claim 15, wherein generating the push notification is based at least in part on determining that the MSISDN is associated with at least one OTT application.

18. The system of claim 15, the acts further comprising:
   receiving, from a serving call session control function (S-CSCF) system, registration information associated with the OTT application;
   generating, based at least in part on the registration information and responsive to receiving the invite message, a service invite; and
   sending the service invite to S-CSCF system.

19. The system of claim 18, wherein the service invite enables opening a session with the UE to provide OTT services to the OTT application.

20. The system of claim 15, wherein the push notification is a hypertext transfer protocol (HTTP) message.

* * * * *